(12) United States Patent
Freund

(10) Patent No.: US 8,441,903 B2
(45) Date of Patent: May 14, 2013

(54) OPTICAL DISK PLAYBACK DEVICE WITH PRESCAN FUNCTIONALITY FOR EARLY DETECTION OF SURFACE IMPERFECTIONS

(75) Inventor: Joseph Michael Freund, Fogelsville, PA (US)

(73) Assignee: LSI Corporation, Milpitas, CA (US)

( * ) Notice: Subject to any disclaimer, the term of this patent is extended or adjusted under 35 U.S.C. 154(b) by 47 days.

(21) Appl. No.: 13/211,869

(22) Filed: Aug. 17, 2011

(65) Prior Publication Data

US 2013/0044577 A1      Feb. 21, 2013

(51) Int. Cl.
*G11B 20/18* (2006.01)
(52) U.S. Cl.
USPC ............... 369/53.35; 369/53.13; 369/53.37
(58) Field of Classification Search ..... 369/53.15–53.17, 369/53.2, 53.35, 53.13, 44.32, 44.37, 44.38, 369/53.31, 53.37
See application file for complete search history.

(56) References Cited

U.S. PATENT DOCUMENTS

| | | | | |
|---|---|---|---|---|
| 4,935,913 A | * | 6/1990 | Shinoda | 369/47.21 |
| 4,980,878 A | * | 12/1990 | Szerlip | 369/53.15 |
| 5,018,124 A | * | 5/1991 | Ogasawara et al. | 369/44.32 |
| 5,130,965 A | * | 7/1992 | Karaki et al. | 369/44.38 |
| 5,267,226 A | * | 11/1993 | Matsuoka et al. | 369/44.29 |
| 5,278,813 A | | 1/1994 | Ohnishi et al. | |
| 5,898,651 A | | 4/1999 | Furusawa | |
| 6,233,210 B1 | | 5/2001 | Schell | |
| 6,339,565 B1 | | 1/2002 | Zhao | |
| 6,704,900 B1 | | 3/2004 | Fechser et al. | |
| 2006/0007817 A1 | * | 1/2006 | Sato et al. | 369/47.1 |

FOREIGN PATENT DOCUMENTS

| | | |
|---|---|---|
| JP | 63124236 A | 5/1988 |
| JP | 1144245 A | 6/1989 |
| JP | 2123539 A | 5/1990 |
| JP | 2000311427 A | 11/2000 |
| JP | 2001066263 A | 3/2001 |
| JP | 2006179152 A | 7/2006 |
| JP | 2007066484 A * | 3/2007 |
| JP | 2007234160 A | 9/2007 |
| JP | 2010231874 A | 10/2010 |

* cited by examiner

*Primary Examiner* — Thang Tran
(74) *Attorney, Agent, or Firm* — Ryan, Mason & Lewis, LLP

(57) ABSTRACT

An optical disk playback device comprises first and second lasers, an optical assembly, first and second optical detectors, and controller circuitry coupled to the optical detectors. The optical assembly is configured to direct incident light from the first and second lasers so as to form respective leading and trailing scanning spots on a surface of an optical disk, and is further configured to direct corresponding reflected light from the leading and trailing scanning spots on the surface of the optical disk to respective ones of the optical detectors. The controller circuitry is configured to identify a surface imperfection of the optical disk by processing the reflected light associated with the leading scanning spot prior to the trailing scanning spot reaching that surface imperfection.

22 Claims, 3 Drawing Sheets

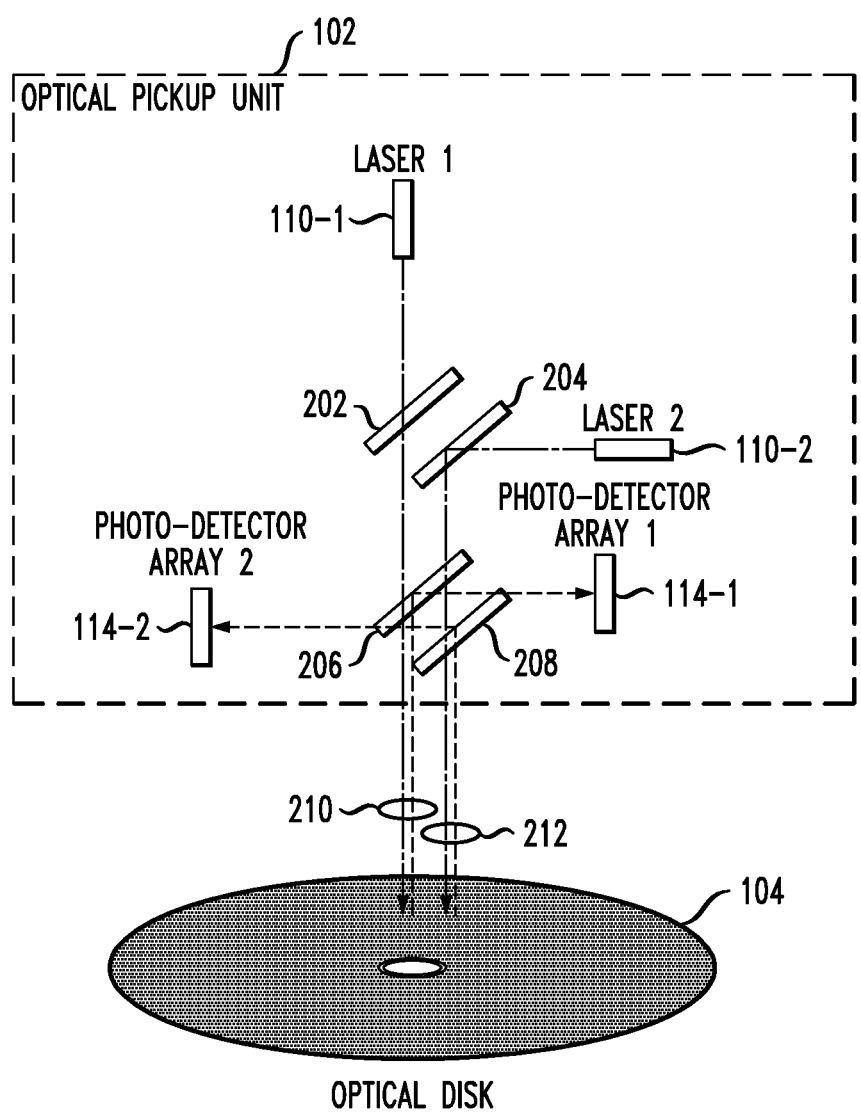

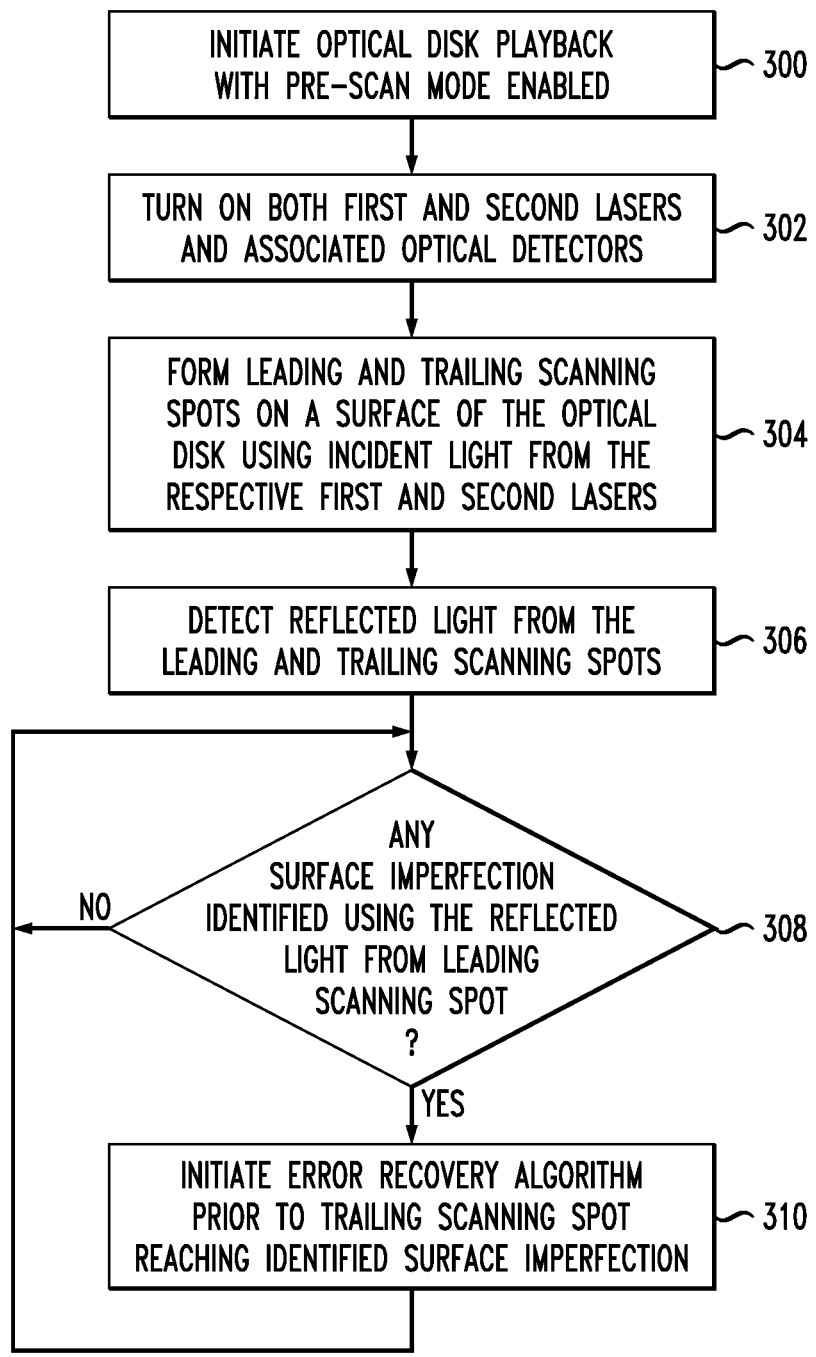

OPTICAL DISK PLAYBACK DEVICE WITH PRESCAN FUNCTIONALITY FOR EARLY DETECTION OF SURFACE IMPERFECTIONS

FIELD OF THE INVENTION

The present invention relates generally to optical disk playback devices, and more particularly to techniques for improving the readout performance of such devices in the presence of surface imperfections on an optical disk.

BACKGROUND OF THE INVENTION

Standardized optical disk storage formats have recently evolved from Digital Versatile Disk (DVD) to Blu-ray. A Blu-ray disk is read using a blue laser having a wavelength of 405 nanometers, significantly shorter than the 650 nanometer red laser used to read DVDs. Information can therefore be stored at a much higher density on Blu-ray disks. For example, a single layer Blu-ray disk can store about 25 Gigabytes (GB) of data, compared to about 5 GB for a DVD. Higher storage densities can be achieved by configuring the optical disk to include multiple storage layers, as is well known.

Although Blu-ray disks have the advantage of higher storage density, the use of a shorter wavelength laser for readout can also be problematic in that it leads to a higher susceptibility to playback errors arising from scratches, fingerprints, dust particles, bubbles or other imperfections on or near the disk surface.

Depending on the extent of the surface imperfection, playback by an optical disk playback device can be briefly interrupted or stopped all together. For small imperfections, the playback device will typically first attempt to re-read the data that is in error, and if it cannot re-read the data, the device may skip ahead and try to read the next data location, continuing this process until the surface imperfection is finally bypassed and normal playback resumes. For larger imperfections, the playback oftentimes freezes completely, as the correction process implemented in the playback device cannot resolve the situation. The user may then have to use a "skip" or "fast forward" feature of the playback device in order to manually step ahead in the playback sequence, until the surface imperfection is bypassed.

SUMMARY OF THE INVENTION

An illustrative embodiment of the present invention provides improved readout performance in an optical disk playback device in the presence of surface imperfections by implementing prescan functionality in which a surface imperfection can be detected and an appropriate error recovery algorithm initiated prior to the read laser reaching the surface imperfection.

In one aspect of the invention, an optical disk playback device comprises first and second lasers, an optical assembly, first and second optical detectors, and controller circuitry coupled to the optical detectors. The optical assembly is configured to direct incident light from the first and second lasers so as to form respective leading and trailing scanning spots on a surface of an optical disk, and is further configured to direct corresponding reflected light from the leading and trailing scanning spots on the surface of the optical disk to respective ones of the optical detectors. The controller circuitry is configured to identify a surface imperfection of the optical disk by processing the reflected light associated with the leading scanning spot prior to the trailing scanning spot reaching that surface imperfection. The controller circuitry may be further configured to initiate an error correction algorithm or other type of error recovery algorithm responsive to the identification of the surface imperfection.

The first and second lasers may both have substantially the same wavelength, or may operate at different wavelengths. In an arrangement of the latter type, the first laser may have a wavelength particularly adapted for reading stored information from a first type of optical disk and the second laser may have a wavelength particularly adapted for reading stored information from a second type of optical disk different than the first type of optical disk. For example, the first type of optical disk may be a DVD optical disk and the second type of optical disk may be a Blu-ray optical disk, with a DVD laser being used to provide the leading scanning spot to prescan for surface imperfections and a Blu-ray laser being used provide the trailing scanning spot to read stored information from the optical disk.

Advantageously, the illustrative embodiments provide significant improvements in readout performance of a Blu-ray optical disk or other type of optical disk in the presence of surface imperfections on that disk. The surface imperfections are detected early using a leading scanning spot, and can therefore be automatically addressed in a manner that is entirely transparent to the viewer, thereby avoiding the need for manual intervention. By way of example, this significant improvement over conventional practice can be achieved in a playback device which already comprises both DVD and Blu-ray readout capability, by utilizing the DVD laser to generate the leading scanning spot that detects surface imperfections prior to readout by the Blu-ray laser. In such an arrangement, the enhanced readout performance may be provided without the need for any significant additional optics or readout hardware.

BRIEF DESCRIPTION OF THE DRAWINGS

FIG. 2 shows a more detailed view of a portion of the FIG. 1 system, illustrating the formation of leading and trailing scanning spots by an optical pickup unit on a surface of an optical disk.

FIG. 3 is a flow diagram showing one mode of operation of the FIG. 1 system.

DETAILED DESCRIPTION OF THE INVENTION

Figure 1:
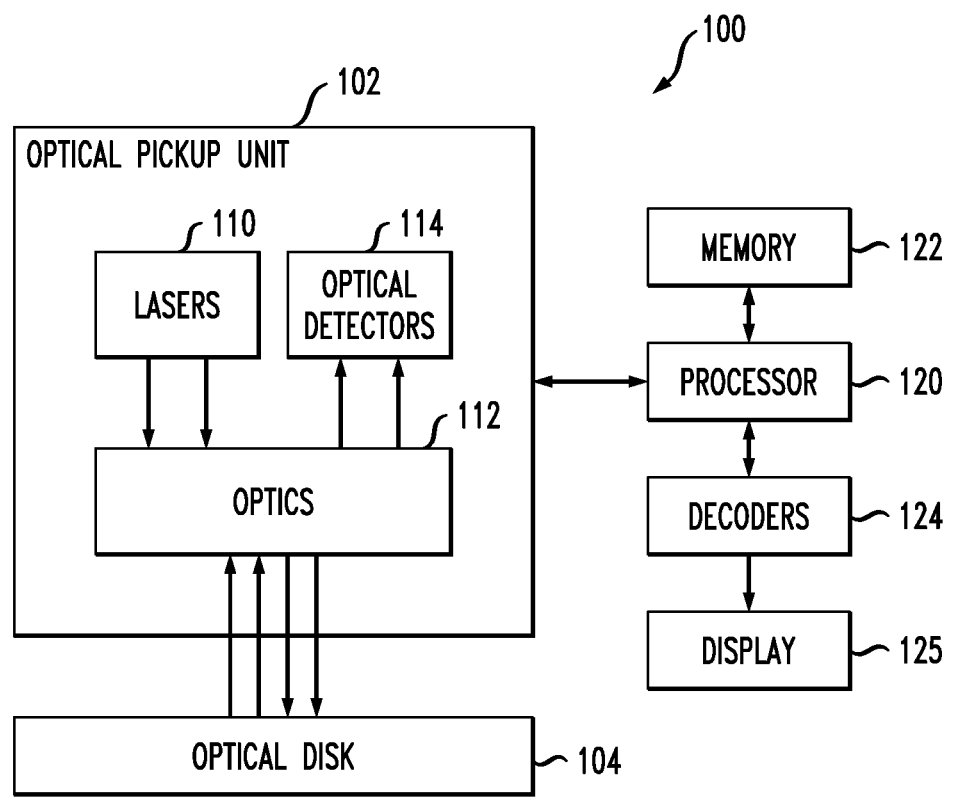
FIG. 1 is a block diagram of an optical disk playback system that incorporates prescan functionality for early detection of surface imperfections in an illustrative embodiment of the invention.

The invention will be illustrated herein in conjunction with an exemplary optical disk playback system that advantageously incorporates prescan functionality for early detection of surface imperfections. It should be understood, however, that the invention is not limited to the particular systems and techniques shown and described. The present invention is more generally applicable to any optical disk playback system in which improved readout performance is desired, and may be implemented using components other than those specifically shown and described in conjunction with the illustrative embodiments.

FIG. 1 shows an optical disk playback system 100 in accordance with an illustrative embodiment of the invention. The playback system 100 in this embodiment more specifically comprises an optical pickup unit 102 that reads stored information from an optical disk 104. The optical pickup unit may also be configured to write information to a recordable optical disk, although such functionality is not a requirement of the present invention. In a typical configuration, the optical disk 104 is inserted in a disk drive which controls the rotation of the disk as well as the positioning of the optical pickup unit 102 relative to grooves of the disk. The drive mechanisms and associated electronics for controlling rotation of the optical disk 104 and positioning of the optical pickup unit 102 are omitted from the figure for clarity and simplicity of illustration, but may be assumed to be implemented in a conventional manner.

The optical pickup unit 102 in the present embodiment comprises lasers 110, optics 112 and optical detectors 114. It will be assumed without limitation that there are at least first and second lasers and at least first and second optical detectors, although other numbers of lasers and detectors can be used in other embodiments. The first and second lasers may both have substantially the same wavelength, or may operate at different wavelengths. In an arrangement of the latter type, the first laser may have a wavelength particularly adapted for reading stored information from a first type of optical disk and the second laser may have a wavelength particularly adapted for reading stored information from a second type of optical disk different than the first type of optical disk. For example, the first type of optical disk may be a DVD optical disk and the second type of optical disk may be a Blu-ray optical disk. Multiple layer optical disks of these and other formats may also be used.

The optics 112 may be viewed as an example of what is more generally referred to herein as an "optical assembly." The term "optical assembly" as used herein is intended to be broadly construed, and may comprise any arrangement of optical elements used to direct light to and from the optical disk 104, and may also include associated structural, mechanical or electrical elements. An optical assembly may comprise entirely separate sets of optics associated with the respective first and second lasers, or may utilize at least a subset of its optical elements to process light from both the first and second lasers. It should therefore be appreciated that the present invention does not require any particular arrangement of optics for directing light to and from the optical disk, even though a more detailed example of such optics will be described in conjunction with FIG. 2.

The optical pickup unit 102 is coupled to a processor 120 which controls the operation of the optical pickup unit and processes signals supplied by and delivered to that unit. The processor 120 may comprise, by way of example, a microprocessor, a digital signal processor (DSP), an application-specific integrated circuit (ASIC), a field-programmable gate array (FPGA), or other integrated circuit device, as well as portions or combinations of such devices. The processor 120 may be viewed as an example of what is more generally referred to herein as "controller circuitry." Such controller circuitry, although shown as separate from the optical pickup unit 102 in the present embodiment, may be implemented at least in part within the optical pickup unit in other embodiments. As the term is used herein, "controller circuitry" may therefore encompass, again by way of illustrative example and without limitation, disk drive electronics, signal processing electronics, and associated processing and memory circuitry, as well as one or more related electromechanical elements utilized to control positioning of the optical pickup unit 102 relative to the surface of the optical disk 104.

The controller circuitry as described above is assumed to be coupled to outputs of the optical detectors 114 and to receive respective detected signals therefrom for further processing associated with prescan and readout, and may additionally be coupled to other elements of the optical pickup unit, such as control inputs of the lasers 110.

Also associated with the processor 120 in the optical playback system 100 is memory 122 and decoders 124. The memory 122 stores executable code that may be executed by processor 120 in implementing at least a portion of the prescan and readout functionality. The memory 122 may comprise electronic memory such as random access memory (RAM) or read-only memory (ROM), in any combination, and is an example of what is more generally referred to herein as a "computer-readable storage medium."

The decoders 124 may comprise, for example, separate DVD and Blu-ray decoders in an embodiment designed to support playback of both DVD and Blu-ray optical disks. Such decoders will generally include MPEG-2 decoding functionality, and may be associated with respective ones of the first and second optical detectors 114. In other embodiments, a single decoder may be used to support multiple optical disk formats.

Information signals read out from the optical disk 104 are processed by decoders 124 to generate video signals suitable for presentation on display device 125. The display device may comprise, for example, a television, computer, mobile telephone, or any other processing device having an ability to display video or other information read out from the optical disk 104 via the optical pickup unit 102.

The system elements 102, 120, 122 and 124 may comprise elements of an otherwise conventional optical disk playback device, such as a Blu-ray player that is also backwards compatible with the DVD format. One or more such elements may be implemented in a processing device such as the television, computer, mobile telephone, or other processing device that provides the display device 125.

System elements such as optical detectors 114, processor 120, memory 122 and decoders 124 may be implemented at least in part in the form of one or more integrated circuits, such as an otherwise conventional system-on-chip (SOC) integrated circuit designed for use in an optical disk player or other optical disk playback device and suitably modified to support prescan functionality as disclosed herein.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

As noted above, a problem that can arise in reading stored information from an optical disk such as optical disk 104 is susceptibility to playback errors arising from scratches, fingerprints, dust particles, bubbles or other imperfections on or near the disk surface. This is particularly true for optical disks having high-density storage formats such as Blu-ray in which the readout is performed using a short wavelength blue laser.

The present embodiment overcomes this significant problem of the prior art at least in part by configuring an optical assembly comprising optics 112 to direct incident light from the first and second lasers 110 so as to form respective leading and trailing scanning spots on a surface of the optical disk 104, and to direct corresponding reflected light from the leading and trailing scanning spots on the surface of the optical disk 104 to respective ones of the optical detectors 114. The processor 120 or other controller circuitry of the system 100 is configured to identify a surface imperfection of the optical disk 104 by processing the reflected light associated with the leading scanning spot prior to the trailing scanning spot reaching that surface imperfection. The controller circuitry may be further configured to initiate an error correction algorithm or other type of error recovery algorithm responsive to the identification of the surface imperfection. Such an error recovery algorithm may be implemented, by way of example, within the processor 120, or within a given one of the decoders 124.

As noted above, the first and second lasers may both have substantially the same wavelength, or may operate at different wavelengths. In an embodiment in which the first laser is a DVD laser configured for reading a DVD optical disk and the second laser is a Blu-ray laser configured for reading a Blu-ray disk, the DVD laser may be used to provide the leading scanning spot to prescan for surface imperfections and the Blu-ray laser may be used to provide the trailing scanning spot to read stored information from the optical disk. More generally, in a playback device in which two different lasers are configured to read two different types of optical disks, the laser configured to read one type of disk serves to form a leading scanning spot when the other type of disk is being read using a trailing scanning spot formed by the other laser, and vice-versa.

The optical disk playback system 100 as illustrated in FIG. 1 may include other elements in addition to or in place of those specifically shown, including one or more elements of a type commonly found in a conventional implementation of such a system. These and other conventional elements, being well understood by those skilled in the art, are not described in detail herein. It should therefore be understood that the particular arrangement of elements shown in FIG. 1 is presented by way of illustrative example only. Accordingly, those skilled in the art will recognize that a wide variety of other optical disk playback system configurations may be used in implementing the invention.

FIG. 2 shows a more detailed view of the optical pickup unit 102 and illustrates the formation of leading and trailing scanning spots on a surface of the optical disk 104. In this figure, the first and second lasers are more specifically identified as lasers 110-1 and 110-2, respectively, and as noted above may comprise lasers configured for reading of respective DVD and Blu-ray optical disks. The lasers 110-1 and 110-1 may therefore comprise a red laser having a wavelength of about 650 nanometers and a blue laser having a wavelength of about 405 nanometers, respectively. The first and second optical detectors are more specifically identified as respective first and second arrays of photo-detectors 110-1 and 114-2.

The optics 112 in this embodiment more specifically comprise optical elements 202, 204, 206 and 208 which are arranged for directing light from the lasers 110 to the optical disk 104 and from the optical disk 104 to the arrays of photo-detectors 110-1 and 114-2. More specifically, the optics 112 direct the incident light from the first laser 110-1 to form leading scanning spot 210 and direct the corresponding reflected light from the leading scanning spot 210 to the first photo-detector array 114-1. Similarly, the optics 112 direct the incident light from the second laser 110-2 to form trailing scanning spot 212 and direct the corresponding reflected light from the trailing scanning spot 212 to the second photo-detector array 114-2. The leading scanning spot 210 is used to prescan for surface imperfections, and the trailing scanning spot is used to read stored information from the optical disk 104.

It should be noted that the scanning spots 210 and 212 are shown in the figure as being above the surface of the optical disk 104, but this is only for clarity of illustration. One skilled in the art will appreciate that the scanning spots in practice will illuminate the actual surface of the optical disk, and are therefore referred to herein as being formed on the surface of the optical disk using light from the lasers 110-1 and 110-2.

In operation, the leading scanning spot 210 scans the groove of the rotating optical disk 104 just ahead of the trailing scanning spot 212. The reflected light from the leading scanning spot 210 is detected in the first photo-detector array 114-1 and the resulting detected signal is used in the above-noted controller circuitry to identify a surface imperfection of the optical disk 104. The reflected light from the trailing scanning spot 212 is detected in the second photo-detector array 114-2 and the resulting detected signal provides readout of stored information for presentation on the display 125. The leading scanning spot 210 is arranged sufficiently in advance of the trailing scanning spot 212 to permit a surface imperfection at a given location to be identified and an appropriate error recovery algorithm to be triggered prior to the trailing scanning spot reaching the location of that surface imperfection.

The optical elements 202, 204, 206 and 208 as shown illustratively comprise optical elements that pass light arriving one direction and reflect light arriving from the opposite direction. For example, optical element 206 directs incident light from laser 110-1 to the surface of the optical disk 104 and directs the corresponding reflected light from the surface of optical disk 104 to the photo-detector array 114-1. Similarly, optical element 208 directs incident light from laser 110-2 to the surface of the optical disk 104 and directs the corresponding reflected light from the surface of optical disk 104 to the photo-detector array 114-2. However, it is to be understood that a wide variety of alternative arrangements of optical elements may be used to direct incident and reflected light in the optical pickup unit 102. Such arrangements of optical elements are all intended to be encompassed by the general term "optical assembly" as used herein.

Referring now to FIG. 3, a flow diagram is shown of a process implemented in the optical playback system 100. The process is performed by the system 100 under the control of processor 120 in an operating mode involving prescanning of the optical disk 104 for surface imperfections. The process includes steps 300 through 310. One or more of the steps may be carried out responsive to execution of corresponding software code in the processor 120.

In step 300, optical disk playback is initiated with the prescan mode enabled. This may involve, for example, a user inserting the optical disk 104 in a disk drive and manipulating appropriate playback device control inputs to select the prescan mode. Thus, a playback device configured in accordance with the invention may provide a user with selectable options to enable or disable generation of the leading scanning spot 210 and thereby to enable or disable the prescan functionality of the playback device. Such options may be provided through suitable modification of an otherwise conventional user interface of the playback device. Alternatively, the playback device may be configured such that the prescan mode of playback is automatically enabled any time playback is selected.

In step 302, both the first and second lasers 110-1 and 110-1 and their corresponding detectors 110-1 and 114-2 are turned on.

In step 304, the leading and trailing scanning spots 210 and 212 are formed on the surface of the optical disk 104 using incident light from the respective first and second lasers 110-1 and 110-2. Although shown as a separate step in the figure, step 304 may be carried out by simply turning on the lasers and detectors in step 302. The scanning spot formation step 304 may additionally or alternatively involve some movement or other adjustment of the positioning of one or more elements of the optics 112, as well as adjusting the speed of rotation of the optical disk 104 until it reaches an appropriate readout speed.

In step 306, reflected light is detected from the leading and trailing scanning spots 210 and 212 in the respective detectors 110-1 and 114-2. The process scans for surface imperfections using the leading scanning spot 210 while simultaneously reading stored information from the disk using the trailing scanning spot 212. The readout of stored information using the trailing scanning spot 212 may be performed in a well-known conventional manner, and is therefore not described in detail herein.

In step 308, a determination is made based on the reflected light from the leading scanning spot 210 whether or not an imperfection is present in the corresponding location on or near the surface of the optical disk 104. Such imperfections may include, for example, scratches, fingerprints, dust particles, bubbles, dents, uneven surface areas, manufacturing defects, recording defects or other imperfections on or near the disk surface, or portions thereof. It should therefore be appreciated that the term "surface imperfections" as used herein is intended to be broadly construed, so as to encompass, for example, defects on or near the surface that may arise during manufacturing of the optical disk or in conjunction with recording of information on the optical disk, as well as those imperfections that may arise by improper handling of the optical disk. Such surface imperfections may therefore include imperfections that extend from the surface into an area below the surface, or are entirely below the surface but are nonetheless detectable from the surface using the leading scanning spot 210.

The detection of particular surface imperfections in the present embodiment involves processing of a detected signal from the detector 114-1 to determine if the detected signal indicates the presence of a surface imperfection. This may involve, for example, matching one or more characteristics of the detected signal to corresponding known characteristics of particular types of surface imperfections. Those skilled in the art will recognize that pattern matching algorithms may be used for this purpose.

If step 308 indicates the presence of a surface imperfection based on the reflected light from the leading scanning spot 210, the process moves to step 310, and otherwise returns to step 306 to continue scanning for surface imperfections using the leading scanning spot 210 while simultaneously reading stored information from the disk using the trailing scanning spot 212. If a surface imperfection of sufficient magnitude is identified, a message to that effect may be presented on the display 125, such the user will understand that the output video may temporarily altered in accordance with the processing operations of an error recovery algorithm. For example, such a message may be generated and displayed upon detection of the previously-noted larger surface imperfection that otherwise under conventional practice might cause the playback process to be completely frozen.

In step 310, the error recovery algorithm is initiated responsive to detection of the surface imperfection in step 308. The error recovery algorithm is initiated for a given surface imperfection location prior to the trailing scanning spot reaching that location, which allows the system additional flexibility in addressing the imperfection. For example, for a particular detected imperfection, the error recovery algorithm that is initiated may direct the decoder to continue to display a previous video output frame for a designated period of time before resuming playback using stored information read from the optical disk. This avoids the above-described conventional problem of playback freezing completely, and does not require any user intervention, such as using a "skip" or "fast forward" feature of the playback device in order to manually step ahead in the playback sequence until the surface imperfection is bypassed. An error recovery algorithm of the type referred to herein will generally allow the imperfection to be bypassed, for example, with the Blu-ray playback decoder supplying appropriate image data so as to minimize visual disturbance to the viewing experience.

The particular process steps and their ordering as illustrated in FIG. 3 may be varied in other embodiments. For example, steps that are shown as being performed sequentially in FIG. 3 may instead be performed at least in part in parallel with one another. Numerous alternative or additional steps may be used.

It was indicated previously that at least a portion of the system 100 may be embodied in an otherwise conventional optical disk playback device, such as a Blu-ray player that is also backward compatible with the DVD format. In an arrangement of this type, the optical disk player will generally comprise two separate playback mechanisms, one for playing back DVDs and the other for playing back Blu-ray disks. The DVD laser of the DVD playback mechanism can generally be turned on and operated entirely independently of the Blu-ray laser of the Blu-ray playback mechanism, and vice-versa. The DVD and Blu-ray lasers can therefore both be turned on together in order to form respective leading and trailing scanning spots on a surface of an optical disk, such that reflected light can be detected from the respective leading and trailing scanning spots. As in one or more of the previously-described embodiments, a surface imperfection of the optical disk may be advantageously detected or otherwise identified by processing the reflected light associated with the leading scanning spot prior to the trailing scanning spot reaching that surface imperfection.

In one or more of the illustrative embodiments, surface imperfections are detected early using a leading scanning spot, and can therefore be automatically addressed in a manner that is entirely transparent to the viewer, thereby avoiding the need for manual intervention. By way of example, this significant improvement over conventional practice can be achieved in the above-noted otherwise conventional playback device which already comprises both DVD and Blu-ray readout capability, by utilizing the DVD laser to generate the leading scanning spot that detects surface imperfections prior to readout by the Blu-ray laser. In such an arrangement, the enhanced readout performance may be provided without the need for any significant additional optics or readout hardware.

Again, it should be emphasized that the above-described embodiments of the invention are intended to be illustrative only. For example, other embodiments can use different types and arrangements of lasers, optics, detectors and controller circuitry. Also, different types of surface imperfection detection techniques and associated error recovery algorithms may be used. As a more particular example, an embodiment may be configured which utilizes more than two lasers, and associated optics and detectors, with one of the lasers and its optics and corresponding detector being optimized to detect surface imperfections on multiple optical disk types, and the other lasers and their optics and corresponding detectors being optimized for readout of stored data from respective different optical disk formats, such as Blu-ray and DVD formats. These and numerous other alternative embodiments within the scope of the following claims will be apparent to those skilled in the art.

What is claimed is:

1. An optical disk playback device comprising:
   first and second lasers;
   an optical assembly;
   first and second optical detectors; and
   controller circuitry coupled to the optical detectors;
   the optical assembly being configured to direct incident light from the first and second lasers so as to form respective leading and trailing scanning spots on a surface of an optical disk;
   the optical assembly being further configured to direct corresponding reflected light from the leading and trailing scanning spots on the surface of the optical disk to respective ones of the optical detectors;
   wherein the controller circuitry is configured to identify a surface imperfection of the optical disk by processing the reflected light associated with the leading scanning spot prior to the trailing scanning spot reaching that surface imperfection:
   wherein the controller circuitry is further configured to initiate an error recovery algorithm that alters operation of a decoder of the playback device responsive to the identification of the surface imperfection.

2. The device of claim 1 wherein the decoder comprising at least one of first and second decoders associated with the respective first and second optical detectors.

3. The device of claim 2 wherein the error recovery algorithm is initiated in the second decoder responsive to the identification of the surface imperfection.

4. The device of claim 1 wherein the optical assembly comprises first optics associated with the first laser and second optics associated with the second laser.

5. The device of claim 1 wherein the first and second optical detectors comprise respective first and second arrays of photo-detectors.

6. The device of claim 1 wherein the first and second lasers are configured to generate the incident light at substantially the same wavelength.

7. The device of claim 1 wherein the first and second lasers are configured to generate the incident light at different wavelengths.

8. The device of claim 7 wherein the first laser has a wavelength particularly adapted for reading stored information from a first type of optical disk and the second laser has a wavelength particularly adapted for reading stored information from a second type of optical disk different than the first type of optical disk.

9. The device of claim 8 wherein the first type of optical disk is a DVD optical disk and the second type of optical disk is a Blu-ray optical disk.

10. The device of claim 1 wherein stored information is read from the optical disk utilizing only the reflected light associated with the trailing scanning spot.

11. A method comprising:
   forming leading and trailing scanning spots on a surface of an optical disk using incident light from respective first and second lasers of a playback device;
   detecting reflected light from the leading and trailing scanning spots;
   identifying a surface imperfection of the optical disk by processing the reflected light associated with the leading scanning spot prior to the trailing scanning spot reaching that surface imperfection; and
   initiating an error recovery algorithm that alters operation of a decoder of the playback device responsive to the identification of the surface imperfection.

12. The method of claim 11 further comprising the step of reading stored information from the optical disk utilizing only the reflected light associated with the trailing scanning spot.

13. The method of claim 11 further comprising the step of displaying a message indicating that the surface imperfection has been identified.

14. The method of claim 11 further comprising the step of providing a selectable option to at least one of enable and disable generation of the leading scanning spot.

15. A non-transitory computer-readable storage medium having embodied therein executable code for performing the steps of the method of claim 11.

16. An optical disk playback system comprising:
   a user interface; and
   first and second playback mechanisms;
   the first and second playback mechanisms being operative to form respective leading and trailing scanning spots on a surface of the optical disk, and to detect reflected light from the respective leading and trailing scanning spots;
   wherein a surface imperfection of the optical disk is identified by processing the reflected light associated with the leading scanning spot prior to the trailing scanning spot reaching that surface imperfection; and
   wherein the user interface provides user selectable options for enabling and disabling generation of the leading scanning spot, that the playback device is operable under user control in at least a first mode in which both the leading and trailing scanning spots are generated and a second mode in which only the trailing scanning spot is generated.

17. The system of claim 16 wherein the first playback mechanism is particularly adapted for reading stored information from a first type of optical disk and the second playback mechanism is particularly adapted for reading stored information from a second type of optical disk different than the first type of optical disk.

18. The system of claim 17 wherein the first type of optical disk is a DVD optical disk and the second type of optical disk is a Blu-ray optical disk.

19. The optical disk playback device of claim 1 wherein the error recovery algorithm directs the decoder to continue to display a previous video output frame for a designated period of time responsive to the identification of the surface imperfection.

20. The method of claim 11 wherein the error recovery algorithm directs the decoder to continue to display a previous video output frame for a designated period of time responsive to the identification of the surface imperfection.

21. An optical disk playback device comprising:
   a user interface;
   first and second lasers;
   an optical assembly;
   first and second optical detectors; and
   controller circuitry coupled to the optical detectors;
   the optical assembly being configured to direct incident light from the first and second lasers so as to form respective leading and trailing scanning spots on a surface of an optical disk;
   the optical assembly being further configured to direct corresponding reflected light from the leading and trailing scanning spots on the surface of the optical disk to respective ones of the optical detectors;
   wherein the controller circuitry is configured to identify a surface imperfection of the optical disk by processing the reflected light associated with the leading scanning spot prior to the trailing scanning spot reaching that surface imperfection; and wherein the user interface provides user selectable options for enabling and disabling generation of the leading scanning spot, such that the playback device is operable under user control in at least a first mode in which both the leading and trailing scanning spots are generated and a second mode in which only the trailing scanning spot is generated.

22. A method comprising:

forming leading and trailing scanning spots on a surface of an optical disk using incident light from respective first and second lasers of a playback device;

detecting reflected light from the leading and trailing scanning spots;

identifying a surface imperfection of the optical disk by processing the reflected light associated with the leading scanning spot prior to the trailing scanning spot reaching that surface imperfection; and providing on a user interface of the playback device user selectable options for enabling and disabling generation of the leading scanning spot, such that the playback device is operable under user control in at least a first mode in which both the leading and trailing scanning spots are generated and a second mode in which only the trailing scanning spot is generated.

* * * * *

UNITED STATES PATENT AND TRADEMARK OFFICE
CERTIFICATE OF CORRECTION

PATENT NO. : 8,441,903 B2
APPLICATION NO. : 13/211869
DATED : May 14, 2013
INVENTOR(S) : Joseph Michael Freund It is certified that error appears in the above-identified patent and that said Letters Patent is hereby corrected as shown below:

In the claims:

Claim 2, col. 9, line 24, please delete "decoder comprising" and insert --decoder comprises--.

Claim 16, col. 10, line 27, please delete "scanning spot, that" and insert --scanning spot, such that--.

Signed and Sealed this
Third Day of September, 2013

Teresa Stanek Rea
*Acting Director of the United States Patent and Trademark Office*